United States Patent
Thielen et al.

(10) Patent No.: US 9,731,685 B2
(45) Date of Patent: Aug. 15, 2017

(54) WINDSHIELD WIPER HAVING A COUPLER WITH POSITIVE LOCKING FEATURES

(71) Applicant: TRICO PRODUCTS CORPORATION, Rochester Hills, MI (US)

(72) Inventors: C. Joseph Thielen, Shelby Township, MI (US); Valentin Avasiloaie, Dearborn Heights, MI (US)

(73) Assignee: Trico Products Corporation, Rochester Hills, MI (US)

( * ) Notice: Subject to any disclaimer, the term of this patent is extended or adjusted under 35 U.S.C. 154(b) by 377 days.

(21) Appl. No.: 14/515,758

(22) Filed: Oct. 16, 2014

(65) Prior Publication Data

US 2015/0033494 A1 Feb. 5, 2015

Related U.S. Application Data

(62) Division of application No. 13/288,578, filed on Nov. 3, 2011, now Pat. No. 8,881,338.

(Continued)

(51) Int. Cl.
*B60S 1/40* (2006.01)
*B60S 1/38* (2006.01)

(52) U.S. Cl.
CPC ........... *B60S 1/4048* (2013.01); *B60S 1/3849* (2013.01); *B60S 1/4003* (2013.01); *B60S 1/4087* (2013.01);

(Continued)

(58) Field of Classification Search
CPC .... B60S 1/4006; B60S 1/4009; B60S 1/4016; B60S 1/4083; B60S 1/4087; B60S 1/4038;

(Continued)

(56) References Cited

U.S. PATENT DOCUMENTS 5,332,328 A 7/1994 Yang
5,611,103 A 3/1997 Lee
(Continued)

FOREIGN PATENT DOCUMENTS

| CN | 101087708 A | 12/2007 |
| EP | 1 479 576 | 11/2004 |
| FR | 2 600 291 A1 | 12/1987 |
| FR | 2830823 A1 | 4/2003 |
| GB | 2 348 118 A | 9/2009 |

(Continued)

OTHER PUBLICATIONS

Communication dated Oct. 15, 2015 enclosing the Supplementary European Search Report dated Oct. 7, 2015 Issued by the European Patent Office in European Patent Application No. 11838804.0.

(Continued)

*Primary Examiner* — Gary Graham
(74) *Attorney, Agent, or Firm* — Miller Canfield

(57) ABSTRACT

A windshield wiper assembly adapted to be mounted to the attachment portion of a wiper arm including a coupler assembly mounted to a wiper blade and serving to interconnect the wiper blade to the wiper arm. The coupler assembly includes a coupler having a body with a pair of sidewalls, a channel defined between the sidewalls and extending substantially parallel thereto. The channel is adapted to cooperatively receive the attachment portion of the wiper arm. A latching mechanism is operatively mounted to the body and movable between an open position spaced from the channel and a closed position disposed over the channel to secure the attachment portion of the wiper arm between the latching mechanism and the body thereby securing the coupler to the attachment portion of the wiper arm.

10 Claims, 8 Drawing Sheets

Related U.S. Application Data

(60) Provisional application No. 61/410,151, filed on Nov. 4, 2010.

(52) U.S. Cl.
CPC .............. *B60S 1/387* (2013.01); *B60S 1/3858* (2013.01); *B60S 2001/4054* (2013.01); *B60S 2001/4058* (2013.01)

(58) Field of Classification Search
CPC .................. B60S 1/4045; B60S 1/4048; B60S 2001/4058; B60S 2001/4054; B60S 2001/4022
USPC ....................................................... 15/250.32
See application file for complete search history.

(56) References Cited

U.S. PATENT DOCUMENTS

| | | |
|---|---|---|
| 5,920,950 A | 7/1999 | Young, III et al. |
| 6,263,538 B1 | 7/2001 | Westermann et al. |
| 6,286,176 B1 | 9/2001 | Westermann et al. |
| 6,978,511 B2 | 12/2005 | Poton |
| 2007/0094833 A1 | 5/2007 | Poton |

FOREIGN PATENT DOCUMENTS

| | | |
|---|---|---|
| JP | 2002-308063 A | 10/2002 |
| WO | 2009155230 A1 | 12/2009 |

OTHER PUBLICATIONS

Communication dated Nov. 3, 2015 issued by the European Patent Office in European Patent Application No. 11838804.0.

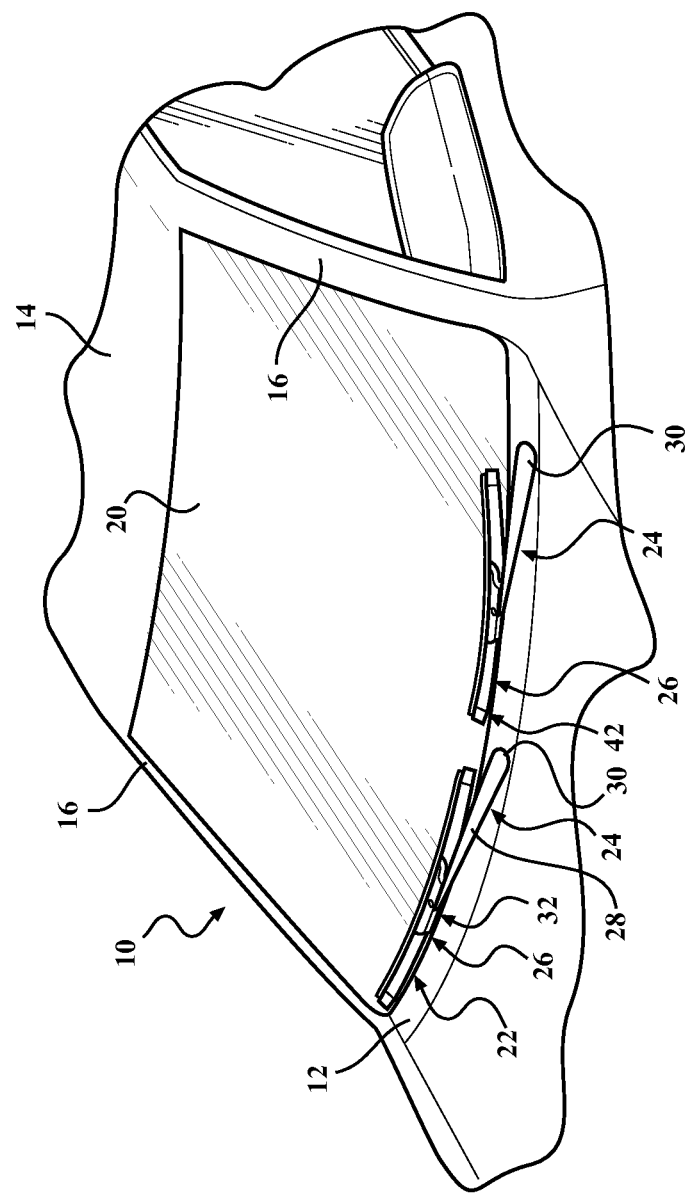

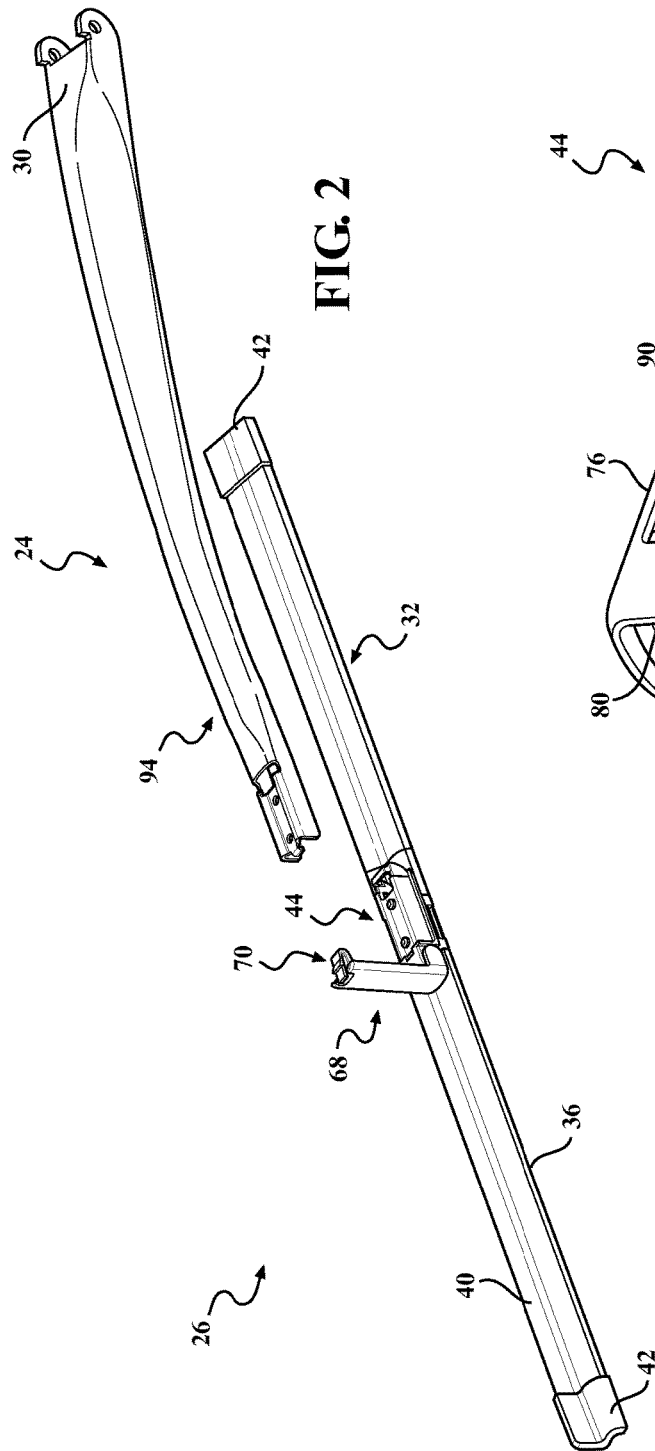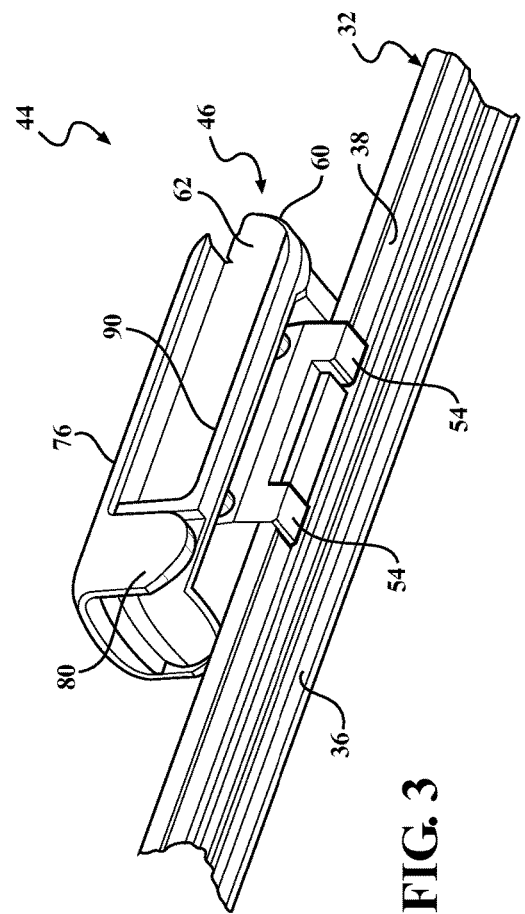

WINDSHIELD WIPER HAVING A COUPLER WITH POSITIVE LOCKING FEATURES

CROSS REFERENCE TO RELATED APPLICATIONS

This application is a divisional of U.S. patent application entitled Windshield Wiper Having a Coupler with Positive Locking Features," having Ser. No. 13/288,578, and filed on Nov. 3, 2011, which claims the benefit of U.S. provisional patent application entitled "Windshield Wiper Having a Coupler with Positive Locking Features," having Ser. No. 61/410,151, and filed on Nov. 4, 2010.

BACKGROUND OF THE INVENTION

1. Field of the Invention

The present invention relates, generally, to windshield wiper assemblies. More specifically, the present invention relates to a windshield wiper assembly having a coupler with features that positively lock the coupler to the attachment portion of a windshield wiper arm.

2. Description of the Related Art

Conventional windshield wiper assemblies known in the related art include some type of wiper blade assembly mounted to an arm which, in turn, is mounted adjacent to a surface to be wiped, such as a windshield. Some type of coupler assembly is typically employed to mount the wiper blade to the arm. The wiper arm is pivotally driven to impart reciprocal motion to the wiper blade assembly across the windshield. A rubber wiping element is supported by the blade assembly and contacts the windshield across the surface to be wiped. The wiper blade is commonly either of the "tournament" or "beam blade" type. Both types of wiper assemblies commonly known in the related art typically incorporate one or more metal strips that act to reinforce the wiper element and facilitate wiping contact by the element across what is typically a curved glass surface. In this context, the wiper arm delivers a downward force to the blade assembly that is distributed thereacross, pressing the blade assembly into contact with the surface to be wiped.

Windshield wiper assemblies are not meant to last forever and ultimately, the wiper blades wear out. Accordingly, wiper blades are designed to be replaced. While each type of windshield wiper assembly mentioned above has worked for its intended purpose, some of the devices used to interconnect the wiper blade to the wiper arm can be confusing to operate. Thus, the public is often frustrated when attempting to replace worn out wiper blades and must enlist the help of an after-market parts supplier or automotive technician for assistance with installing the replacement blade. This can require added time and cost to the process of replacing the worn out wiper blade.

Accordingly, there remains a need in the art for a windshield wiper assembly having a coupler that positively mounts the wiper blade to the wiper arm and that is intuitive and easy to operate such that it is unlikely to require the user to seek assistance in replacing a worn out wiper blade.

SUMMARY OF THE INVENTION

The present invention overcomes many limitations and disadvantages in the related art in a windshield wiper assembly adapted to be mounted to the attachment portion of a wiper arm that imparts reciprocal motion to the windshield wiper assembly across the surface to be wiped. The windshield wiper assembly of the present invention includes a wiper blade adapted to contact the surface to be wiped. A coupler assembly is operatively mounted to the wiper blade and serves to interconnect the wiper blade to the wiper arm. The coupler assembly includes a coupler having a body with a pair of sidewalls, a channel defined between the pair of sidewalls and extending substantially parallel thereto. The channel is adapted to cooperatively receive the attachment portion of the wiper arm. In addition, the coupler assembly includes a latching mechanism that is operatively mounted to the body and movable between an open position spaced from the channel and a closed position disposed over the channel to secure the attachment portion of the wiper arm between the latching mechanism and the body thereby securing the coupler to the attachment portion of the wiper arm. In this way, the windshield wiper assembly of the present invention provides a coupler that positively mounts the wiper blade to the wiper arm and is intuitive and easy to operate such that it is unlikely to require the user to seek assistance in replacing the worn out wiper blade.

Other objects, features and advantages of the present invention will be readily appreciated as the same becomes better understood after reading the subsequent description taken in connection with the accompanying drawings.

BRIEF DESCRIPTION OF THE DRAWINGS

FIG. 1 is a partial perspective view of the front of an automotive vehicle having a pair of windshield wiper assemblies that are pivotally mounted for reciprocal movement across the windshield of the vehicle;

FIG. 2 is a perspective assembly view of one embodiment of the windshield wiper assembly of the present invention;

FIG. 3 is a perspective view illustrating one embodiment of the coupler assembly mounted to the wiper blade;

DETAILED DESCRIPTION OF THE PREFERRED EMBODIMENT(S)

Figure 5:
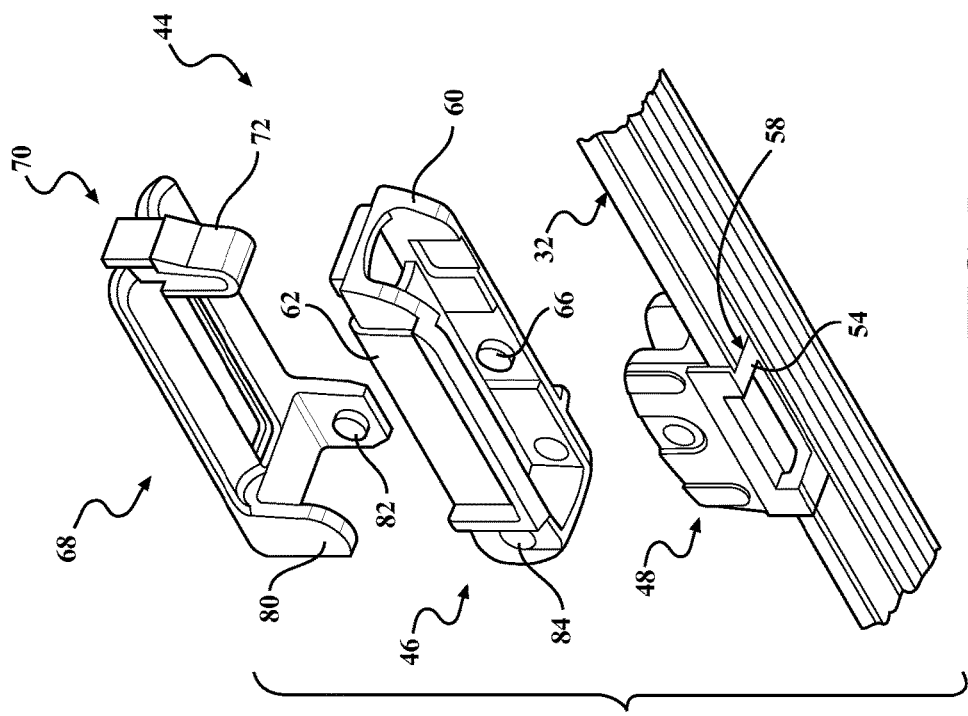
FIG. 5 is an exploded view of one embodiment of the coupler assembly taken from the vantage point of the underside thereof.

Referring now to the figures, where like numerals are used to designate like structure, a portion of a representative vehicle is schematically illustrated at 10 in FIG. 1. The vehicle includes a cowl 12, a roof 14, and a pair of laterally spaced front or "A" pillars 16 extending between the roof 14 and the cowl 12. The A-pillars 16, roof 14, and cowl 12 cooperate to define a generally rectangular opening 18 in which is supported a curved or "swept back" glass windshield 20.

A wiper system is generally indicated at 22 in FIG. 1 and is employed to clean the glass windshield 20. The wiper system 22 includes a wiper arm, generally indicated at 24 and a wiper assembly, generally indicated at 26. Those having ordinary skill in the art will appreciate that a wiper system 22 may include more than one wiper arm 24 and more than one wiper assembly 26. By way of example and as indicated in FIG. 1, a wiper system 22 may include a pair of wiper arms 24 and wiper assemblies 26, which correspond to the driver and passenger side of the vehicle 10.

The wiper arm 24 imparts reciprocal motion to the windshield wiper assembly 26 across the surface to be wiped, in this case the windshield. To this end, the wiper arm 24 includes a pivot end 30 operatively attached to an electrical motor (not shown) to move the wiper arm 24 across the surface to be wiped in an oscillating manner. The wiper arm 24 further includes an elongate body 28 that extends outward from a pivot end 30 and an attachment member, described in greater detail below. The elongate body 28 has a predetermined length that is designed to direct the wiper assembly 26 across the appropriate surface area. Accordingly, it will be appreciated that the predetermined length of the elongate body 28 will vary depending on the surface area to be wiped. Furthermore, those having ordinary skill in the art will appreciate that the elongate body 28 may be jointed for movement away from the surface to be wiped in order to facilitate replacement of the wiper assembly 26 when worn or to perform other maintenance or repair to the wiper system 22 or adjacent area of the vehicle 10. In addition to these elements, the wiper arm 24 may further include a biasing member (not shown), such as a spring, to provide a biasing force that facilitates contact between the wiper assembly 26 and the windshield 20 of the vehicle 10.

The windshield wiper assembly 26 includes a wiper blade, generally indicated at 32, that is adapted to contact the surface to be wiped. In this context, the windshield wiper assembly 26 of the present invention may employ either a tournament style wiper blade or a beam blade style wiper blade. In the representative example illustrated in the figures, the windshield wiper assembly is shown using a beam blade type wiper blade 32. However, those having ordinary skill in the art will appreciate that any type of conventional wiper blade may be employed in the assembly of the present invention without departing from the scope of the invention.

Referring to FIGS. 2-7, the representative wiper blade 32 illustrated in the figures includes a wiping element, generally indicated at 36, that is adapted to contact the surface of the vehicle 10 to be wiped, in this representative example, the windshield 20. The wiping element 36 has a predetermined length and cross-sectional profile corresponding to a particular application and is typically constructed from a flexible rubber. Those having ordinary skill in the art will appreciate that the wiping element 36 may be constructed from any flexible material, such as silicone or other polymer, and via any manufacturing process, such as extrusion or injection molding, without departing from the scope of the invention.

Because the representative wiper blade 32 illustrated in the drawings is of the beam blade type, it includes an elongated beam 38 (FIG. 3) that operatively engages the wiping element 36. The elongated beam 38 is adapted to distribute downward pressure from the wiper arm 24 across the wiping element 36. In the embodiment illustrated in the figures, the wiping element 36 may be operatively attached to the bottom of the elongated beam 38 by an adhesive/epoxy. However, those having ordinary skill in the art will appreciate that the wiping element may be operatively mounted to the elongated beam 38 by other methods such as through a slot defined in the elongated beam 38 that receives a portion of the wiping element 36. Furthermore, those having ordinary skill in the art will appreciate that the wiper assembly 26 may include more than one elongated beam 38 that is operatively engaged to the wiping element 36. Alternatively and as noted above, the wiper blade 32 may be of the tournament style or any other conventional type of blade.

Figure 4:
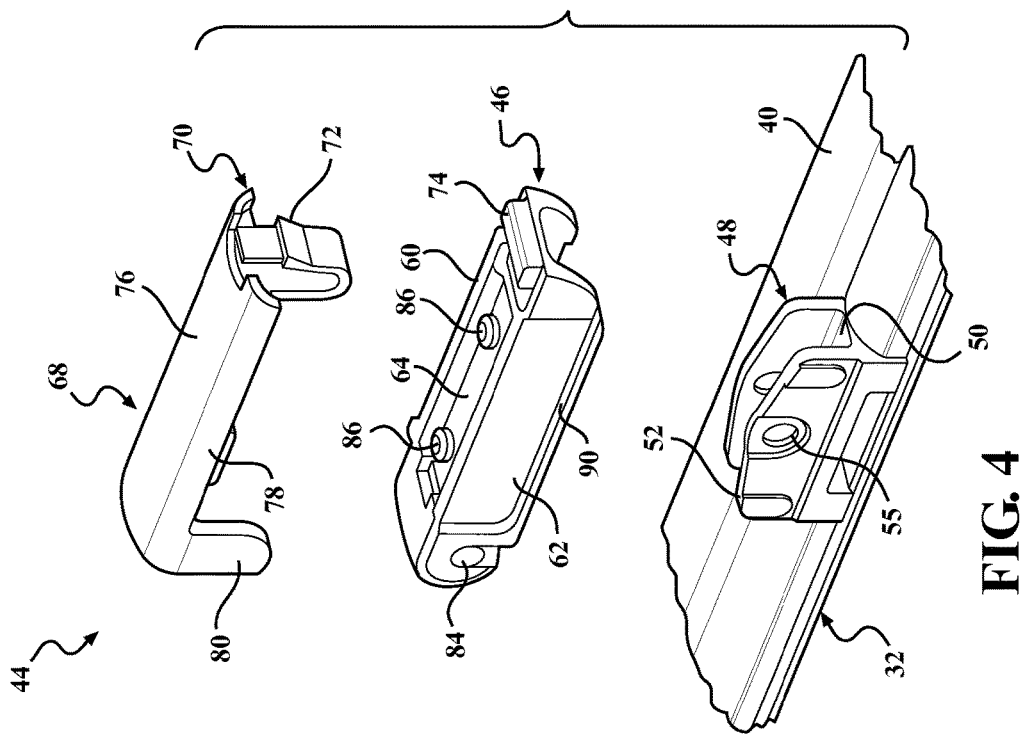
FIG. 4 is an exploded view of one embodiment of the coupler assembly.

As best shown in FIGS. 2 and 4, the wiper assembly 26 may also include an airfoil, generally indicated at 40 that utilizes airflow to increase downward force on to the wiper assembly 26 and thereby reduces the likelihood of windlift during operational movement across the surface to be wiped. Those having ordinary skill in the art will appreciate that the airfoil 40, elongated beam 38 and wiping element 36 may be joined together through any conventional means such as bonding the airfoil 40 to the top end of the elongated beam 38 via adhesive/epoxy or by employing additional structure such as a retainer or spline that couples the wiping element 36 to the elongated beam 38 or the elongated beam 38 to the airfoil 40 without departing from the scope of the invention. The airfoil 40 may be manufactured from a thermoplastic material via, for example, an extrusion process, or an injection molding process using a polymer composition having greater hydrophobic properties than the materials used for manufacturing the wiping element 36.

The wiper assembly 26 may also include a pair of end caps, generally indicated at 42. The end caps 42 are adapted to operatively engage the airfoil 40 and include a profile that substantially mimics the contours of the airfoil 40 to maintain the wind lift characteristics of the wiper assembly 26 and to provide an increased aesthetic value.

Referring now to FIGS. 3-7, the wiper assembly 26 further includes a coupler assembly, generally indicated at 44, that is operatively mounted to the wiper blade 32 and serves to interconnect the wiper blade to the wiper arm 24. To this end, the coupler assembly 44 includes a coupler, generally indicated at 46, and an adapter, generally indicated at 48. Each of these components will be described in greater detail below.

Figure 7:
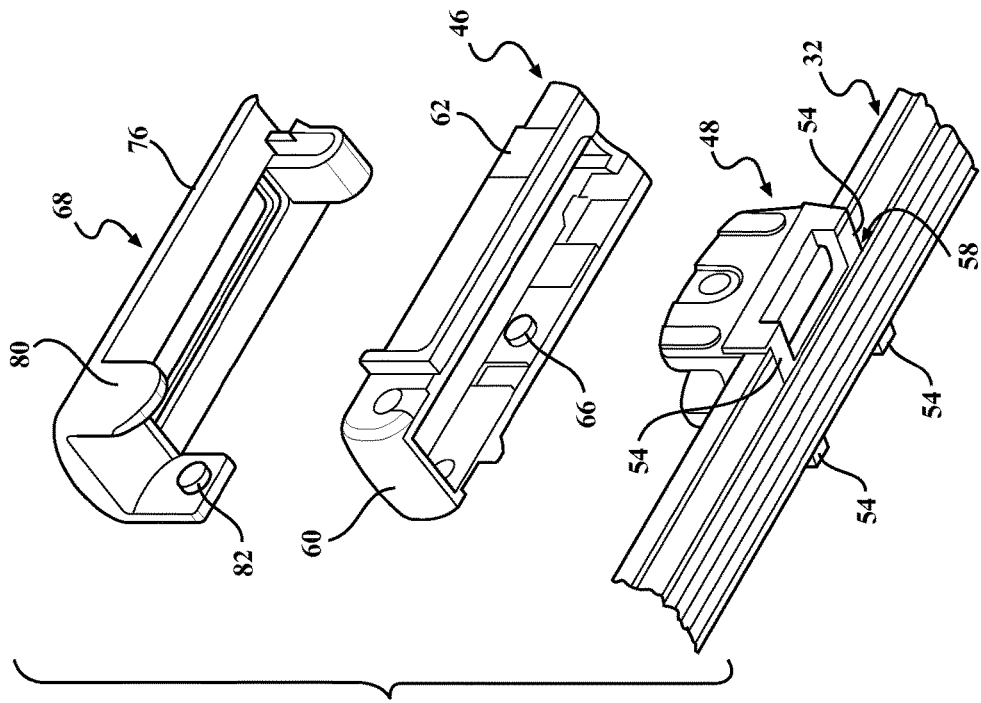
FIG. 7 is an exploded perspective view of the coupler assembly taken from the underside thereof from a vantage point that is longitudinally opposite to that illustrated in FIG. 5.
Figure 6:
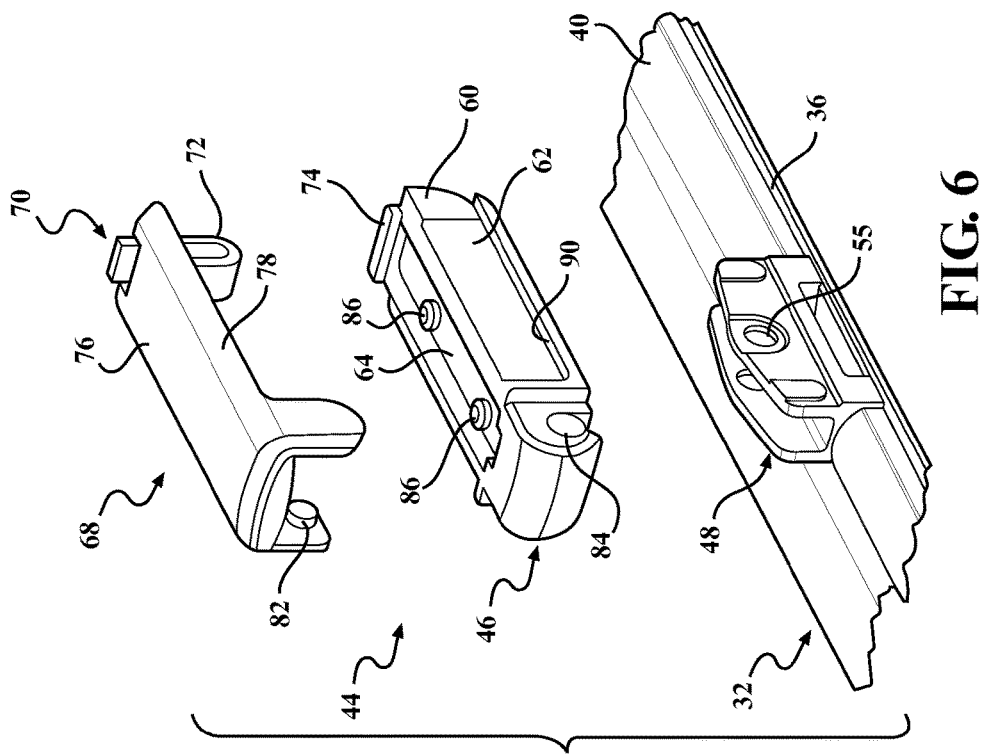
FIG. 6 is an exploded view of one embodiment of the coupler assembly taken from a vantage point that is longitudinally opposite to that illustrated in FIG. 4.

More specifically, the adapter 48 is generally disposed at an intermediate position along the length of the wiper blade 32. The adapter 48 includes a base 50 and a pair of upstanding sidewalls 52 disposed in spaced parallel relationship with respect to the base 50. The base 50 also includes a plurality of transversely extending tangs 54 that are adapted to operatively engage the bottom of the elongated beam 38. The adapter 48 also includes a hole 55 that extends through the pair of upstanding walls 52 for a purpose that will be described below. The tangs 54 cooperate to define a track, generally indicated at 58, that operatively receives an intermediate portion of the elongated beam 38. As shown in FIG. 7, the adapter 48 may include four transversely extending tangs 54 operatively disposed adjacent to the airfoil 40 to accommodate the resiliency of the elongated beam 38. In this manner, a portion of the elongated beam 38 is retained within the track 58, but remains able to flex in response to the curvature of the surface to be wiped.

However, those having ordinary skill in the art will appreciate that the tangs 54 may include additional structure to prevent axial movement between the adapter 48 and the elongated beam 38. By way of example, one or more of the tangs 54 may further include a post and the elongated beam 38 may include a corresponding detent that is adapted to receive the post to prevent such axial movement of the adapter 48 relative to the elongated beam 38. Those having ordinary skill in the art will appreciate that the adapter 48 may be operatively attached to the elongated beam 38 by several methods other than as described above. By way of example, the adapter 48 may be fixed by adhesive, riveting or welding to the elongated beam 38.

The coupler 46 includes a body 60 having a pair of sidewalls 62. A channel 64 is defined between the sidewalls 62 and extends substantially parallel thereto. The channel 64 is adapted to cooperatively receive the attachment portion of the wiper arm 24, as will be described in greater detail below. The body 60 is operatively mounted to the adapter 48. To this end, the body 60 includes a pair of inwardly extending bosses 66. The bosses 66 extending between the pair of upstanding sidewalls 62 on the adapter 48 are received in the hole 55 defined in the walls 52 of the adapter to mount the body 60 to the adapter 48.

Figure 8:
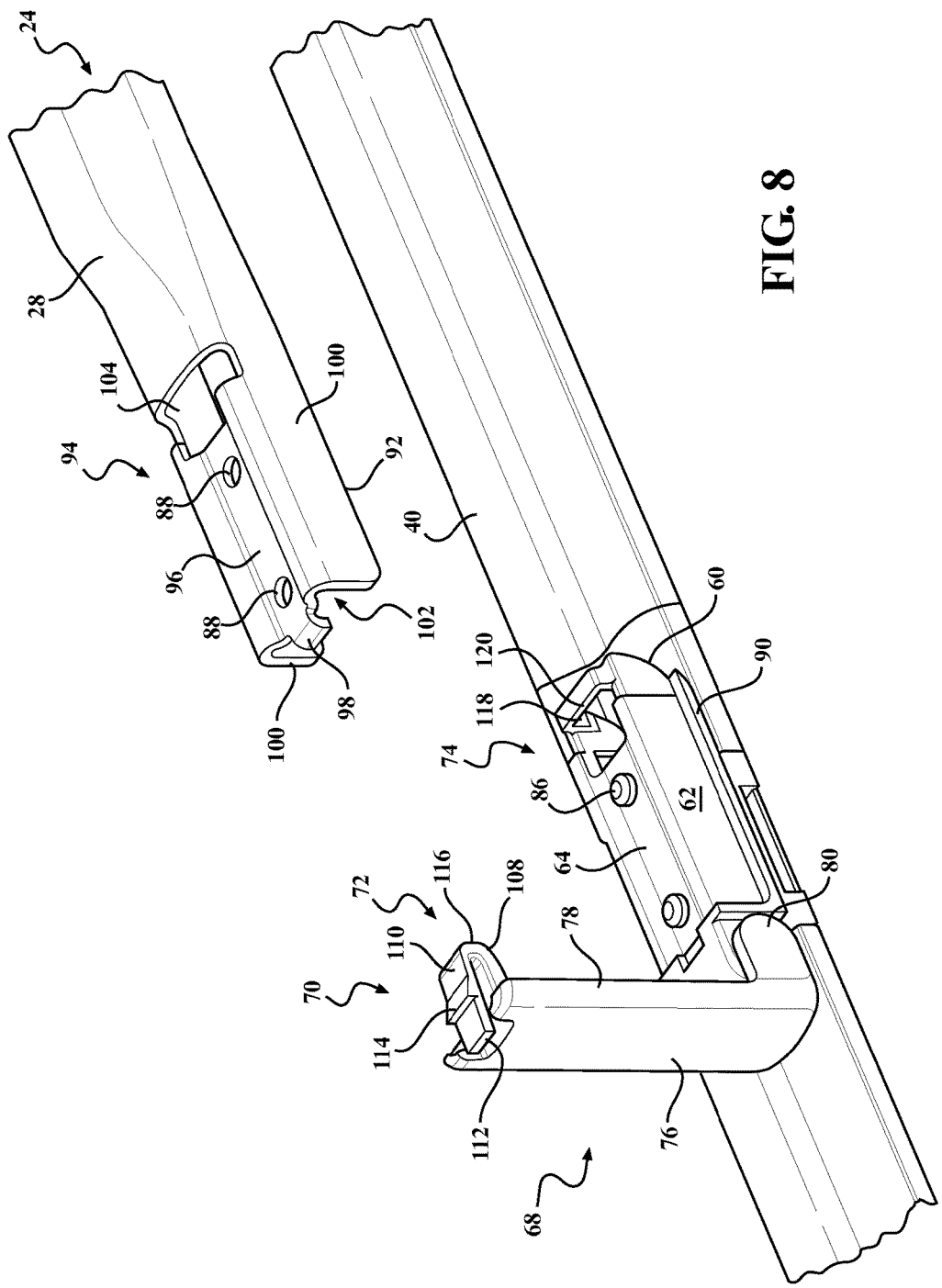
FIG. 8 is a partial perspective assembly view of a windshield wiper assembly showing one embodiment of the coupler assembly in preparation for mounting to the attachment member of the wiper arm.
Figure 9:
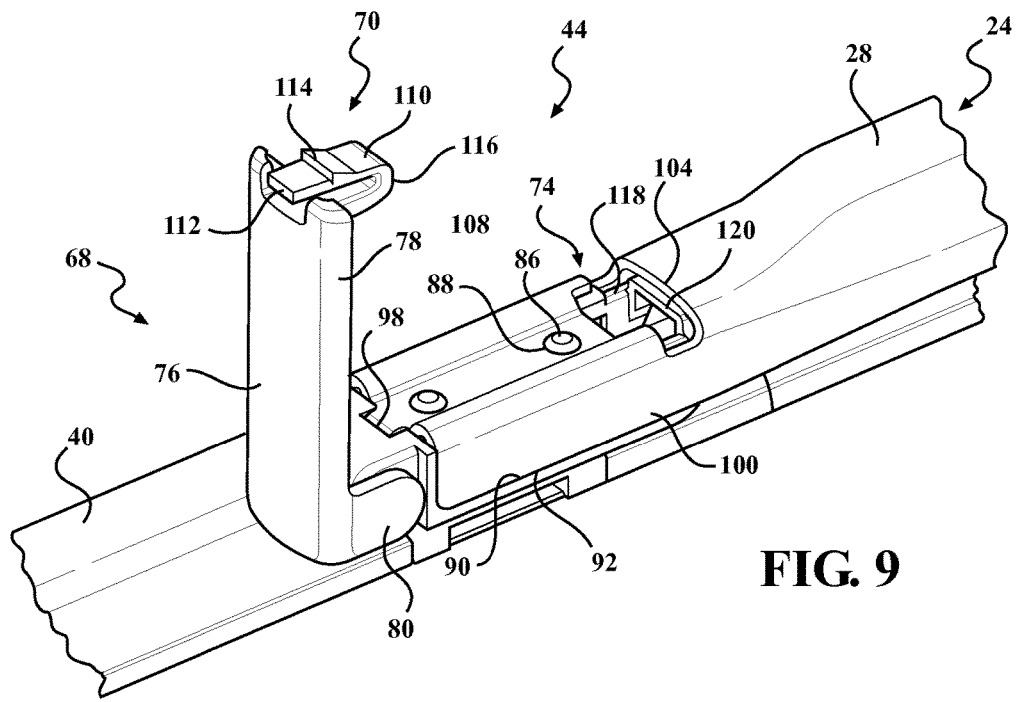
FIG. 9 is a partial perspective assembly view of a windshield wiper assembly showing the attachment member of the wiper arm mounted relative to one embodiment of the coupler assembly with the latching mechanism disposed in its open position.
Figure 10:
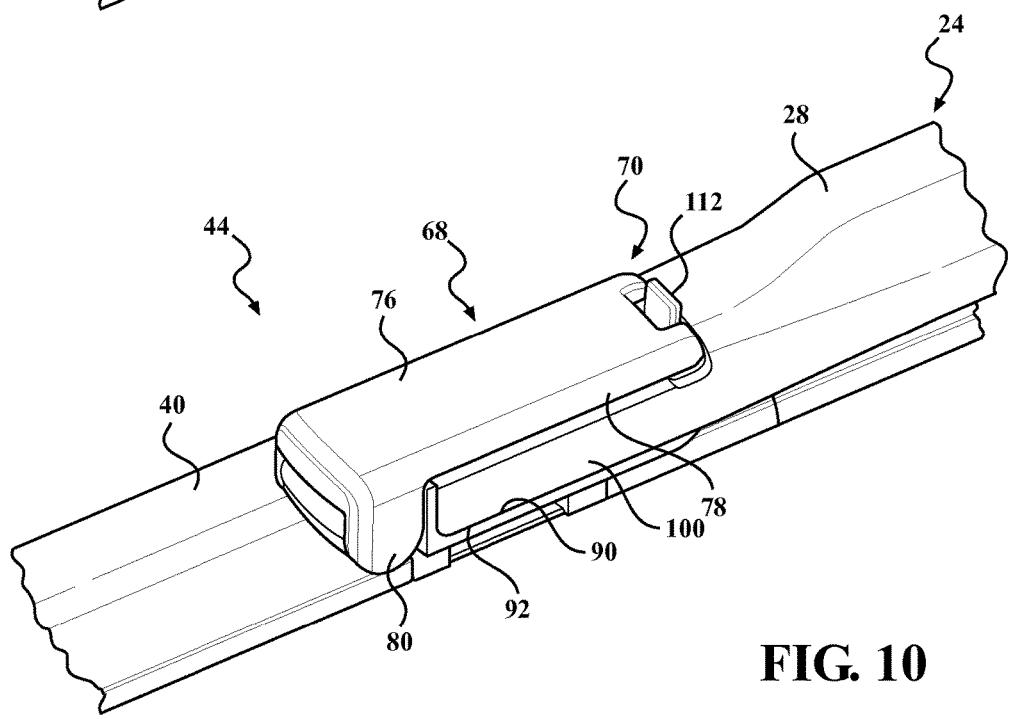
FIG. 10 is a partial perspective assembly view of the windshield wiper assembly mounted to a wiper arm with one embodiment of the latching mechanism disposed in its closed position.

A latching mechanism, generally indicated at 68, is operatively mounted to the body 60 and is moveable between an open position spaced from the channel 64 as illustrated in FIGS. 8-9 and a closed position disposed over the channel 64, as illustrated in FIG. 10, to secure the attachment portion of the wiper arm 24 between the latching mechanism 68 and the body 60. In this way, the coupler 46 is secured to the attachment portion of the wiper arm 24. The latching mechanism 68 also includes a locking member, generally indicated at 70, that serves to secure the latching mechanism 68 in the closed position. The locking member 70 includes at least one flexible arm, generally indicated at 72. The body 60 defines a retainer 74. The flexible arm 72 is adapted for releasable engagement with the retainer 74 so that the latching mechanism 68 is snap-fit relative to the body 60 when in the closed position. The structural detail of the locking member 70 and the interaction of the latching mechanism 68, as well as the body with respect to different types of attachment members, will be described in greater detail below.

The latching mechanism 68 defines a top wall 76 and a pair of sidewalls 78 that depend from the top wall 76. In addition, the latching mechanism 68 includes a pair of ears 80 extending in cantilevered fashion from the pair of sidewalls 78 and disposed spaced from the locking member 70. The ears 80 include a pair of inwardly projecting bosses 82 that are axially aligned with respect to one another. In turn, the body 60 includes a pair of inwardly extending openings 84. The bosses 82 are adapted to be cooperatively received in the inwardly extending openings 84 such that the latching mechanism 68 is pivotally mounted relative to the body 60 about an axis defined by the bosses 82. However, those having ordinary skill in the art will appreciate that the bosses may be formed on the body and the inwardly extending openings may be formed on the ears without departing from the scope of the invention.

In addition, the channel 64 may include one or more lugs 86 disposed in spaced relationship with respect to each other and extend upwardly from the channel 64. The lugs 86 are adapted to be received in corresponding holes 88 defined in the various embodiments of the attachment portion of the wiper arm, as will be described in greater detail below. However, those having ordinary skill in the art will appreciate that the lugs 86 are optional.

The body 60 of the coupler 46 also defines a pair of shoulders 90 that extend along the longitudinal length of the sidewalls 78. The sidewalls 78 of the latching mechanism 68 are juxtaposed in side-by-side relationship with the sidewalls 62 of the body 60 and adjacent the shoulder 90 when the latching mechanism 68 is in its closed position.

As noted above, the wiper arm 24 further includes an attachment member. There are two types of attachment members illustrated in the figures. One embodiment of an attachment member is generally indicated at 94 in FIGS. 2 and 8-10. The attachment member 94 is disposed at or adjacent to the end of the elongate body 28, opposite the pivot end 30 of the wiper arm 24. The attachment member 94 is adapted to operatively engage the coupler 46, as will be described in greater detail below. In the embodiment illustrated in FIGS. 8-9, the attachment member 94 includes a base 96 and bent tab 98 extending linearly outward from the base 96. The attachment member 94 further includes a pair of rails 100 depending from the base 96 aligned with respect to each other. The rails have terminal edges 92. The base 96 and rails 100 cooperate to define a track, generally indicated at 102, that is operatively received and retained by the coupler assembly 44, as will be described in greater detail below. In addition, the attachment member 94 includes an aperture 104 as well as the spaced holes 88 formed on the base 96. The locking member 70 of the coupler assembly 44 illustrated in FIGS. 8-10 is designed to accommodate the attachment member 94 illustrated in the figures.

More specifically and referring to FIGS. 8-10, the flexible arm 72 of the locking member 70 of this embodiment has a first portion 108 that extends in cantilevered fashion from the top wall 76 of the latching mechanism 68 in a first direction, as well as a second portion 110 that is spaced from the first portion 108 and extends in a direction opposite to the first portion 108. The second portion 110 terminates in a distal end 112. A shoulder 114 is formed on the second portion 110 located spaced from the distal end 112. A hinge portion 116 interconnects the first 108 and second 110 portions such that the second portion 110 flexes upon coming into contact with the retainer 74 to move toward the first portion 108 until the shoulder 114 engages the retainer 74 and locks the latching mechanism 68 in the closed position.

On the other hand, the retainer 74 includes an opening 118 defined in the body 60. The opening 118 corresponds with the aperture 104 formed on the base 96 of the attachment portion 94 illustrated in FIGS. 8-9. The retainer opening 118 defines a locking ridge 120. The shoulder 114 of the second portion 110 of the flexible arm 72 is adapted to be disposed in abutting engagement with the locking ridge 120 when the latching mechanism 68 is in its closed position (FIG. 10). Similarly, the lugs 86 are adapted to be received in the spaced holes 88 formed on the attachment member 94 as illustrated in FIGS. 8-9. In addition, the terminal edge 92 of the rails 100 are disposed adjacent the shoulders 90 when the attachment member 94 is mounted in the coupler 46. As used herein, the term "adjacent" means that the terminal edge 92 of the rails 100 of the attachment member 94 may be disposed immediately next to, or, alternatively, in abutting contact with, the shoulders 90 of the body 60 when the attachment member 94 is received by the coupler 46. In this way, and when the latching mechanism 68 is disposed in its closed position, the attachment member 94 of the wiper arm 24 is sandwiched between the latching mechanism 68 and the channel 64 defined in the body 60 of the coupler 46. Thus, the coupler 46 is positively mounted in a locked fashion to the attachment member 94.

When it is desired to replace the wiper blade 32, for example when the blade has become worn, the distal end 112 of the second portion 110 may be biased toward the first portion to disengage the shoulder 114 from the locking ridge 120. The latching mechanism 68 then may be rotated about the axis defined between the bosses 82 and the openings 84 to move the latching mechanism 68 to its first, open position. The attachment member 94 may be then easily removed from the coupler 46 and a new wiper blade installed thereon.

Figure 11:
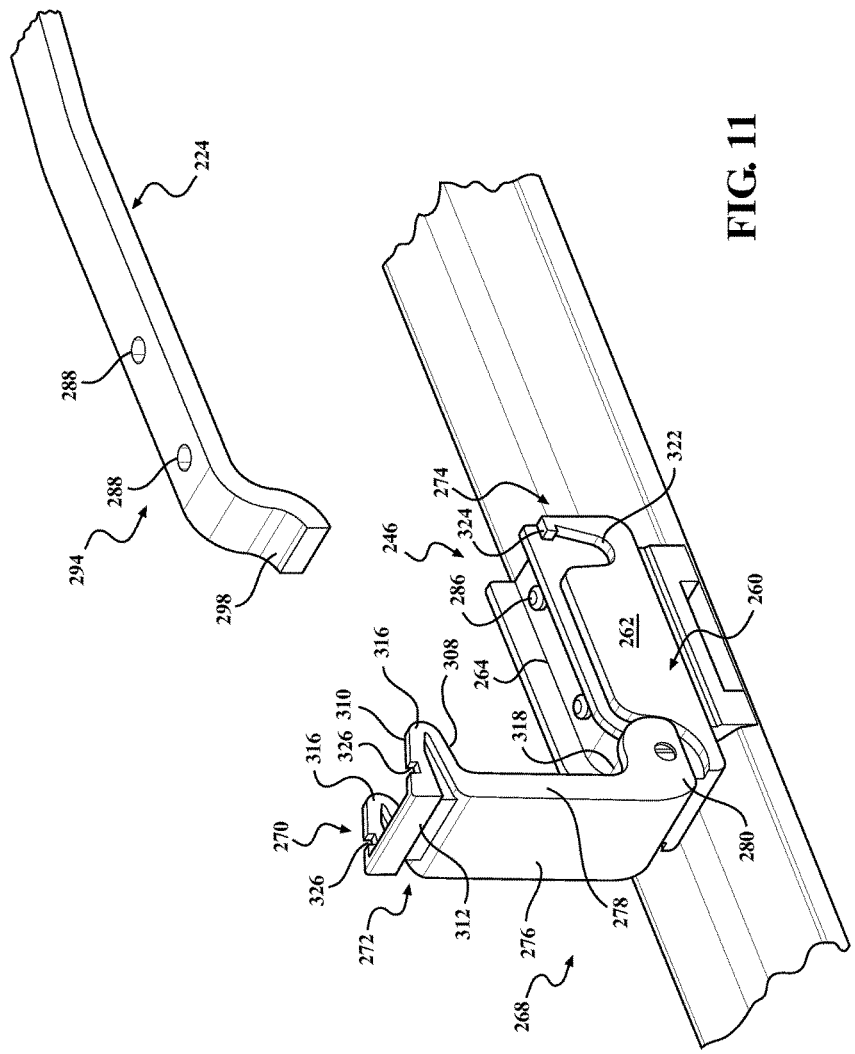
FIG. 11 is a partial perspective assembly view of a windshield wiper assembly having another embodiment of the coupler assembly of the present invention.
Figure 12:
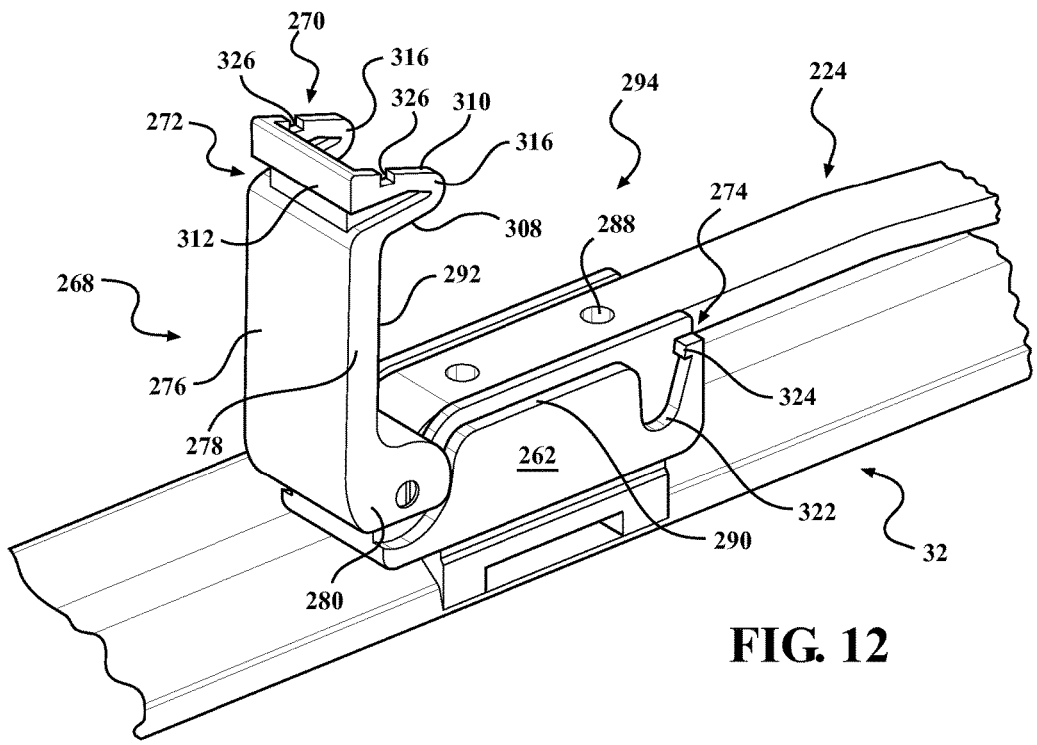
FIG. 12 is a partial perspective assembly view of a windshield wiper assembly having the embodiment of the coupler assembly illustrated in FIG. 11 showing the latching mechanism in its first, open position.
Figure 13:
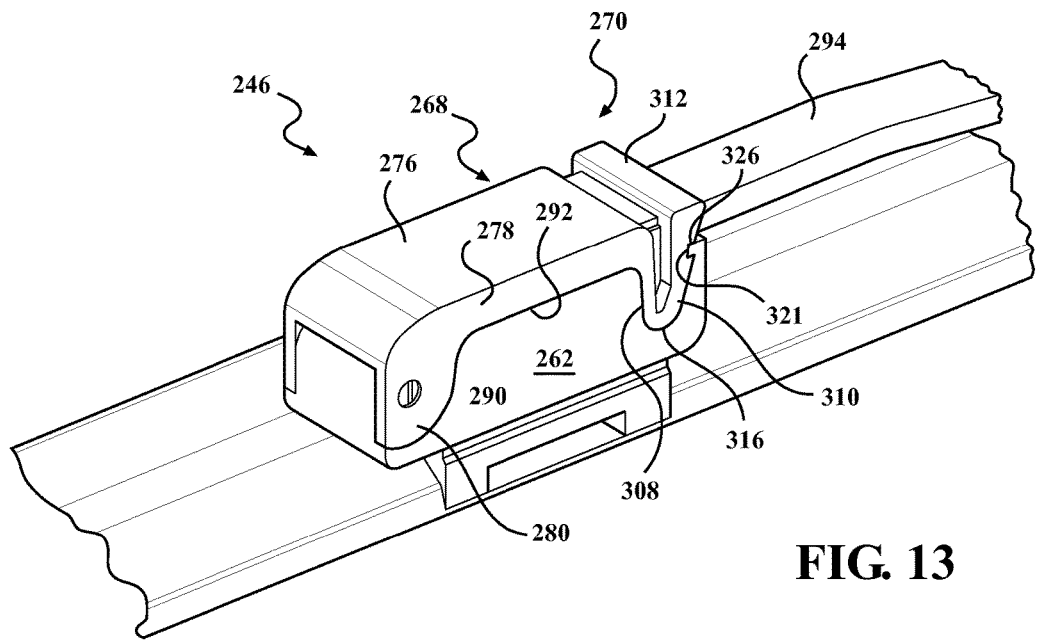
FIG. 13 is a partial perspective assembly view of a windshield wiper assembly having the embodiment of the coupler assembly illustrated in FIG. 11 showing the latching mechanism disposed in its second, closed position.

Another embodiment of the coupler having a locking member that is specifically designed to cooperate with a different type attachment member is illustrated in FIGS. 11-13. In this case, the attachment member 294 of the wiper arm 224 is essentially a substantially flat, rectangular wire stock that terminates in a bent tab 298 extending linearly outward and downwardly from the wire stock. A pair of spaced holes 288 are formed in the rectangular wire stock 294 to cooperate with the lugs 286 defined in the channel 264 of the body 260 of the coupler 246.

The embodiment of the coupler 246 that is designed to accommodate this attachment member 294 is substantially similar to the coupler illustrated in FIGS. 2-10. Accordingly, like numerals increased by two hundred are used to designate like structure between the two embodiments. In addition, and because of the similarities, the description that follows will focus on the differences between these two embodiments. Thus, the reader may assume that where structure of this embodiment has not been described, it is the same as the embodiment illustrated in FIGS. 2-10.

In the embodiment illustrated in FIGS. 11-13, the opening 318 disposed in the body 260 is located biased toward the ears 280 and is adapted to accommodate the bent tab 298 extending linearly outward and downwardly from the wire stock attachment member 294.

The latching mechanism 268 defines a top wall 276 and a pair of sidewalls 278 depending therefrom. The locking member 270 includes a pair of flexible arms 272 interconnected by a cross member 312. Each of the pair of flexible arms 272 has a first portion 308 extending cantilevered from the sidewalls 278 in a first direction as well as a second portion 310 spaced from the first portion 308 and extending in a direction opposite the first portion 308. The second portion 310 terminates at the cross member 312. A hinge portion 316 interconnects each of the first 308 and second 310 portions such that the second portions 310 flex upon coming in contact with the retainer 274 to move toward the first portion 308 until the retainer 274 is engaged and the latching mechanism 268 is locked in a closed position.

The retainer 274 includes a pair of upwardly opening slots 322 formed in the sidewall 262 of the body 260 of the coupler 246. Each of the slots 322 includes at least one tongue 324 extending outwardly therefrom. Each of the second portions 310 of the flexible arms 272 includes a groove 326 that corresponds to the tongue 324. The pair of upwardly opening slots 322 correspond to the pair of flexible arms 272 and cooperate therewith to receive the pair of flexible arms 272 such that the tongues 324 are received in the grooves 326 so as to retain the latching mechanism 268 when the latching mechanism 268 is in its second, closed position.

When the latching mechanism 268 is disposed in its closed position, the bent tab 298 of the flat wire stock attachment member 294 is disposed in the opening 318 and the lugs 286 extending upwardly from the body 260 are received in holes 288 defined in the attachment member 294 such that the attachment member 294 of the wiper arm 224 is sandwiched between the latching mechanism 268 and the channel 264 defined in the body 260 of the coupler 246. In addition, the terminal edge 292 of the sidewalls 278 are disposed adjacent the opposite edge 290 of the sidewalls 262 of the body 260 of the coupler when the latching mechanism 268 is in its closed position. As used herein, the term "adjacent" means that the terminal edge 292 of the sidewalls 278 of the latching mechanism 268 may be disposed immediately next to, or alternately, in abutting contact with, the opposite edge 290 of the sidewall 262 of the body 260 when the latching mechanism 268 is in its closed position. Thus, the coupler 246 is positively mounted in a locked fashion to the attachment member.

When it is desired to replace the wiper blade, for example when the blade has become worn, the cross member 312 of the second portion 310 may be biased toward the first portion 308 to disengage the tongues 324 from the grooves 326 such that the latching mechanism 368 may be rotated about the axis defined between the bosses 282 and the openings 284 out of engagement with the retainer 274 to move the latching mechanism 268 to its first, open position. The attachment member 294 may be then easily removed from the coupler 246 and a new wiper blade installed thereon.

The body 60, 260 of the coupler 46, 246 may be manufactured from any suitable plastic material. Because of the sandwiching effect between the latching mechanism 68, 268, the metal attachment member 94, 294, as well as the channel 64, 264 defined in the plastic body 60, 260, the coupler assembly 44 of the present invention provides a very strong connection between the wiper arm 24 and the windshield wiper assembly 26. Thus, the windshield wiper assembly 26 of the present invention provides a coupler assembly 44 that positively mounts the wiper blade to the wiper arm and is intuitive and easy to operate such that it is unlikely to require the user to seek assistance in replacing the worn out wiper blade.

The invention has been described in an illustrative manner. It is to be understood that the terminology which has been used is intended to be in the nature of words of description rather than of limitation. Many modifications and variations of the invention are possible in light of the above teachings. Therefore, the invention may be practiced other than as specifically described.

What is claimed is:

1. A windshield wiper assembly adapted to be mounted to the attachment portion of a wiper arm that imparts reciprocal motion to the windshield wiper assembly across a surface to be wiped, said windshield wiper assembly comprising:
   a wiper blade adapted to contact the surface to be wiped;
   a coupler assembly operatively mounted to said wiper blade and serving to interconnect said wiper blade to the wiper arm;
   said coupler assembly including a coupler having a body defining a retainer, said body including a pair of sidewalls, a channel defined between said sidewalls and extending substantially parallel thereto, said channel adapted to cooperatively receive the attachment portion of the wiper arm; and a latching mechanism operatively mounted to said body and moveable between an open position spaced from said channel and a closed position disposed over said channel to secure the attachment portion of the wiper arm between said latching mechanism and said body thereby securing said coupler to the attachment portion of the wiper arm, said latching mechanism including a locking member, said locking member serving to secure said latching mechanism in said closed position;

said latching mechanism defining a top wall and a pair of sidewalls depending therefrom, said locking member includes a pair of flexible arms interconnected by a cross member, each of said pair of flexible arms having a first portion extending cantilevered from said sidewalls in a first direction, and a second portion spaced from said first portion extending in a direction opposite said first portion and terminating in said cross member, a hinge portion interconnecting each of the first and second portions such that said second portions flex upon coming in contact with said retainer to move toward said first portion until engaging said retainer and locking said latching mechanism in said closed position.

2. The windshield wiper assembly as set forth in claim 1 wherein said retainer includes a pair of upwardly opening slots formed in said sidewall of said body, each slot including at least one tongue, each of said second portions of said flexible arms including a groove that corresponds to said tongue, said pair of upwardly opening slots corresponding to said pair of flexible arms and cooperating therewith to receive said pair of flexible arms such that said tongues are received in said groove so as to retain said latching mechanism when said latching mechanism is in said closed position.

3. The windshield wiper assembly as set forth in claim 1 wherein said latching mechanism includes a pair of ears extending in cantilevered fashion from said pair of sidewalls and disposed spaced from said locking member, said ears including a pair of inwardly projecting bosses that are axially aligned with respect to one another, said body including a pair of inwardly extending openings, said bosses adapted to be cooperatively received in said inwardly extending openings such that said latching mechanism is pivotally mounted relative to said body about an axis defined by said bosses.

4. The windshield wiper assembly as set forth in claim 1 wherein said channel includes a pair of lugs disposed in spaced relationship with respect to each other and extending upwardly from said channel, said lugs adapted to be received in corresponding holes defined in the attachment portion of the wiper arm.

5. The windshield wiper assembly as set forth in claim 1 wherein said body of said coupler defines a pair of shoulders extending along the longitudinal length of said sidewalls, said sidewalls of said latching mechanisms juxtaposed in side-by-side relationship with said sidewalls of said body and adjacent said shoulder when said latching mechanism is in said closed position.

6. The windshield wiper assembly as set firth in claim 1 wherein said coupler assembly includes an adapter operatively mounted to said wiper blade, said body operatively mounted to said adapter.

7. The windshield wiper assembly as set forth in claim 6 wherein said adapter includes a base and a pair of upstanding sidewalls disposed in spaced parallel relationship with respect to said base, said base including a plurality of transversely extending tangs that are adapted to operatively engage said wiper blade.

8. The windshield wiper assembly as set forth in claim 6 wherein said adapter includes holes in a pair of upstanding walls, said body including a pair of inwardly extending bosses, said bosses received in said holes to mount said body to said adapter.

9. A windshield wiper assembly adapted to be mounted to the attachment portion of a wiper arm that imparts reciprocal motion to the windshield wiper assembly across a surface to be wiped, said windshield wiper assembly comprising: a wiper blade adapted to contact the surface to be wiped;

a coupler assembly including an adapter operatively mounted to said wiper blade and serving to interconnect said wiper blade to the wiper arm;

said coupler assembly including a coupler having a body operatively mounted to said adapter, said body including a pair of sidewalls, a channel defined between said sidewalls and extending substantially parallel thereto, said channel adapted to cooperatively receive the attachment portion of the wiper arm; and a latching mechanism operatively mounted to said body and moveable between an open position spaced from said channel and a closed position disposed over said channel to secure the attachment portion of the wiper arm between said latching mechanism and said body thereby securing said coupler to the attachment portion of the wiper arm;

said latching mechanism includes a locking member, said locking member includes at least one flexible arm, said body of said coupler defining a retainer, said flexible arm adapted for releasable engagement with said retainer so that said latching mechanism is snap fit relative to said body when in said closed position;

said latching mechanism further defining a top wall and a pair of sidewalls depending therefrom, said locking member includes a pair of flexible arms interconnected by a cross member, each of said pair of flexible arms having a first portion extending cantilevered from said sidewalls in a first direction, and a second portion spaced from said first portion extending in a direction opposite said first portion and terminating in said cross member, a hinge portion interconnecting each of the first and second portions such that said second portion flex upon coming in contact with said retainer to move toward said first portion until engaging said retainer and locking said latching mechanism in said closed position.

10. The windshield wiper assembly as set forth in claim 9 wherein said retainer includes a pair of upwardly opening slots formed in said sidewall of said body, each slot including at least one tongue, each of said second portions of said flexible arms including a groove that corresponds to said tongue, said pair of upwardly opening slots corresponding to said pair of flexible arms and cooperating therewith to receive said pair of flexible arms such that said tongues are received in said groove so as to retain said latching mechanism when said latching mechanism is in said closed position.

* * * * *